United States Patent
Fisher et al.

(10) Patent No.: US 7,404,184 B2
(45) Date of Patent: Jul. 22, 2008

(54) EFFICIENT FIRMWARE UPDATE FOR HIERARCHICAL DATA STORAGE SYSTEMS

(75) Inventors: James Arthur Fisher, Tucson, AZ (US); Jonathan Wayne Peake, Tucson, AZ (US); Christine Lynette Telford, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 10/939,805

(22) Filed: Sep. 13, 2004

(65) Prior Publication Data

US 2006/0059305 A1    Mar. 16, 2006

(51) Int. Cl.
*G06F 9/44* (2006.01)

(52) U.S. Cl. ............... 717/168; 717/174; 711/114; 711/154

(58) Field of Classification Search ......... 711/154, 711/114; 717/168, 174
See application file for complete search history.

(56) References Cited

U.S. PATENT DOCUMENTS

| | | | | |
|---|---|---|---|---|
| 5,155,678 A | | 10/1992 | Fukumoto et al. | 395/425 |
| 5,367,701 A | * | 11/1994 | von Gnechten et al. | 711/117 |
| 5,544,304 A | * | 8/1996 | Carlson et al. | 714/10 |
| 5,555,418 A | | 9/1996 | Nilsson et al. | 395/700 |
| 5,708,809 A | | 1/1998 | Leimkoetter | 395/704 |
| 5,781,776 A | | 7/1998 | Johnston et al. | 395/704 |
| 6,078,990 A | | 6/2000 | Frazier | 711/114 |
| 6,085,333 A | * | 7/2000 | DeKoning et al. | 714/7 |
| 6,101,327 A | | 8/2000 | Holte-Rost et al. | 395/712 |
| 6,289,510 B1 | | 9/2001 | Nakajima | 717/11 |
| 6,292,856 B1 | * | 9/2001 | Marcotte | 710/39 |
| 6,360,363 B1 | | 3/2002 | Moser et al. | 717/11 |
| 6,675,258 B1 | * | 1/2004 | Bramhall et al. | 711/114 |
| 6,728,833 B2 | * | 4/2004 | Pruett et al. | 711/114 |
| 6,782,448 B2 | * | 8/2004 | Goodman et al. | 711/112 |
| 6,907,504 B2 | * | 6/2005 | Burton et al. | 711/162 |
| 2002/0046311 A1 | * | 4/2002 | Kageyama | 710/105 |
| 2003/0188304 A1 | | 10/2003 | Goodman et al. | 717/171 |
| 2005/0044329 A1 | * | 2/2005 | Fisher et al. | 711/154 |

OTHER PUBLICATIONS

"Spectra 20K Library User Guide", Spectra Logic Corporation, pp. 1-8, 70 and 95-102, last modified Apr. 15, 2003; P.N. 90920001 Revision A.

"McDATA Intrepid 6064 Director Supports Sun StorEdge SAN 4.1: Offers High Port Density and High Availability for Data Center Storage" Mar. 24, 2003.

Reynolds et al., "Storage Area Network Proposal," HP SureStore Storage Solutions, Chapter 6, section 6.1, Feb. 1, 2000.

* cited by examiner

*Primary Examiner*—Gary J Portka
*Assistant Examiner*—Anton Rabovianski
(74) *Attorney, Agent, or Firm*—Kunzler & McKenzie

(57) ABSTRACT

An apparatus, system, and method are disclosed to shutdown a library manager while the library system remains in a partially online state. A message module is included to send a suspend message to a host such that the host stops sending library manager commands, a shutdown module is included to shutdown a library manager while a data storage device remains coupled to the host in an online state, a startup module is included to restart the library manager in response to a completed library manager maintenance operation, and a resume module is included to send a resume message to the host that the library manager is available for library manager commands.

20 Claims, 6 Drawing Sheets

EFFICIENT FIRMWARE UPDATE FOR HIERARCHICAL DATA STORAGE SYSTEMS

BACKGROUND OF THE INVENTION

1. Field of the Invention

This invention relates to shutting down library managers and more particularly relates to shutting down one or more library managers while maintaining a library system online.

2. Description of the Related Art

Currently, updating code in a hierarchical data storage system such as the International Business Machine ("IBM") 3494 Tape Library Dataserver is a disruptive process. FIG. 1 illustrates a typical library system 100. The system 100 may include one or more hosts 102, a device controller 104 in communication with a host 102, one or more library managers 106 in communication with the device controller 104, and one or more storage devices 108 in communication with the device controller 104, and the library managers 106.

A dual library manager system may be termed a Highly Available ("HA") library manager system where a first library manager 106a is a primary and a second library manager 106b is a backup that can quickly be brought online if the first library manager 106a fails. A library system 100 may include also a single library manager 106a and/or a single storage device 108. Alternatively, the system 100 includes an array of device controllers 104, library managers 106 and storage devices 108. A storage device 108 is typically a computer readable tape, a compact disk, a removable disk drive, or other storage device managed by a library manager 106. One skilled in the art will recognize other applicable library systems 100.

Currently, object code (also referred to as code) implementing the library manager 106 is typically not running when new code is activated or for other maintenance operations. To update the library manager code, the library manager 106 typically is taken offline and then shutdown. As used herein, offline refers to a state where the library system 100 is not accessible by a host 102. As used herein, shutdown refers to a state where code is not in a condition to be executed and the code and other device components may be modified, updated, or replaced. In a dual library manager system 100, the code can be updated or minor maintenance operations performed on a first offline library manager 106a. Then, the updated first library manager 106a can be brought online while a second library manager 106b is taken offline in a switchover process. This can be accomplished while storage devices 108 remain online in relation to the host 102.

Unfortunately, this switchover process is limited. Specifically the conventional switchover process does not allow for code updates of a single library manager system or for a dual library manager system 100 when both library managers need to be varied offline at the same time for a major code update or maintenance operation.

For single library manager systems or for systems with more than one library manager 100 where a code update requires all library managers to be varied offline at the same time, currently the whole library system 100 is taken offline with respect to a host 102. Taking the library system 100 offline can be a very time consuming process due to a possible long completion time of data transaction commands and library manager commands currently queued. While the library system 100 is being varied offline, the library system 100 is unavailable for new data transactions or library manager transactions. Scheduling several hours for a busy library system 100, such as an HA library system 100, to be offline may be a difficult task and may cause costly delays while the system 100 is unavailable.

From the foregoing discussion, it should be apparent that a need exists for an apparatus, system, and method to shutdown library managers while maintaining the library system in a partially online state. Beneficially, such an apparatus, system, and method would greatly reduce the time required for a maintenance operation or code update, would allow major code updates or maintenance operations while the library system remains in a partially online state, and would maintain a host in a partially online state allowing data operations with previously mounted storage devices to continue. Also, after major code updates or maintenance operations are complete, the library is brought fully online and all normal operations resume.

SUMMARY OF THE INVENTION

The present invention has been developed in response to the present state of the art, and in particular, in response to the problems and needs in the art that have not yet been fully solved by currently available library manager shutdown methods. Accordingly, the present invention has been developed to provide an apparatus, system, and method for shutting down a library manager that overcomes many or all of the above-discussed shortcomings in the art.

The apparatus to shutdown a library manager is provided with a logic unit containing a plurality of modules configured to functionally execute the necessary steps of shutting down a library manager while the library system remains in a partially online state. These modules in the described embodiments include a message module to send a suspend message to a host such that the host stops sending library manager commands, a shutdown module to shutdown a library manager while a data storage device of a library managed by the library manager remains coupled to the host in an online state, a startup module to restart the library manager in response to a completed library manager maintenance operation, and a resume module to send a resume message to the host that the library manager is available for library manager commands.

The apparatus, in one embodiment, is configured to include a rejection module to reject a library manager command from the host. In another embodiment, the apparatus includes a process command module to selectively process a library manager command in a queue and a currently executing library manager command. In another embodiment, the apparatus includes a fail command module to selectively fail a library manager command in a queue and a currently executing library manager command. In an alternate embodiment, the fail command module is configured to selectively fail a library manager command in a queue and a currently executing library manager command, in response to an expired timeout period or user intervention.

In another embodiment, a command storage module is included to selectively store a library manager command that is in a queue and a currently executing library manager command. In an alternate embodiment, the command storage module is further configured to selectively store a library manager command that is in a queue and a currently executing library manager command, in response to an expired timeout period or user intervention. In yet another embodiment, the startup module is further configured to execute a stored library manager command.

The apparatus is further configured, in one embodiment, to include a cancel module to cancel shutdown of a library manager, resume processing library manager commands, and send a resume message to the host that the library manager is available for library manager commands. Alternatively, the shutdown module is further configured to shutdown a plurality of library managers and the startup module is further configured to restart a plurality of library managers.

A system of the present invention is also presented to shutdown a library manager while the library system remains in a partially online state. The system may be embodied by one or more hosts, one or more storage devices within the library system, a library manager, and a controller module. In an alternate embodiment, the system may include more than one device controller. In another embodiment, the system may include more than one library manager. In particular, the controller module, in one embodiment, includes a message module to send a suspend message to a host such that the host stops sending library manager commands, a shutdown module to shutdown a library manager while a data storage device of a library managed by the library manager remains coupled to the host in an online state, a startup module to restart the library manager in response to a completed library manager maintenance operation, and a resume module to send a resume message to one or more hosts that the library manager is available for library manager commands.

The system may further include, a process command module to selectively process a library manager command in a queue and a currently executing library manager command. In one embodiment, the controller module includes a fail command module to selectively fail a library manager command in a queue and a currently executing library manager command, in response to an expired timeout period or user intervention. In another embodiment, the controller module includes a command storage module to selectively store a library manager command that is in a queue and a currently executing library manager command, in response to an expired timeout period or user intervention, and the startup module is configured to execute a stored library manager command. In an alternate embodiment, the shutdown module is further configured to shutdown a plurality of library managers and the startup module is further configured to restart a plurality of library managers.

A method of the present invention is also presented for shutting down a library manager while a host remains in a partially online state. As used herein online refers to a state where a host may communicate normally with a library system. The method in the disclosed embodiments substantially includes the steps necessary to carry out the functions presented above with respect to the operation of the described apparatus and system. In one embodiment, the method includes sending a suspend message to a host such that the host stops sending library manager commands, shutting down a library manager while a data storage device of a library managed by the library manager remains coupled to the host in an online state, restarting the library manager in response to a completed library manager maintenance operation, and sending a resume message to the host that the library manager is available for library manager commands. The method also may include rejecting a library manager command from the host.

In a further embodiment, the method includes selectively processing a library manager command in a queue and a currently executing library manager command. In another embodiment, the method includes selectively failing a library manager command in a queue and a currently executing library manager command, in response to an expired timeout period or user intervention. In yet another embodiment, the method includes selectively storing a library manager command that is in a queue and a currently executing library manager command, in response to an expired timeout period or user intervention and executing a stored library manager command upon startup of the library manager.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
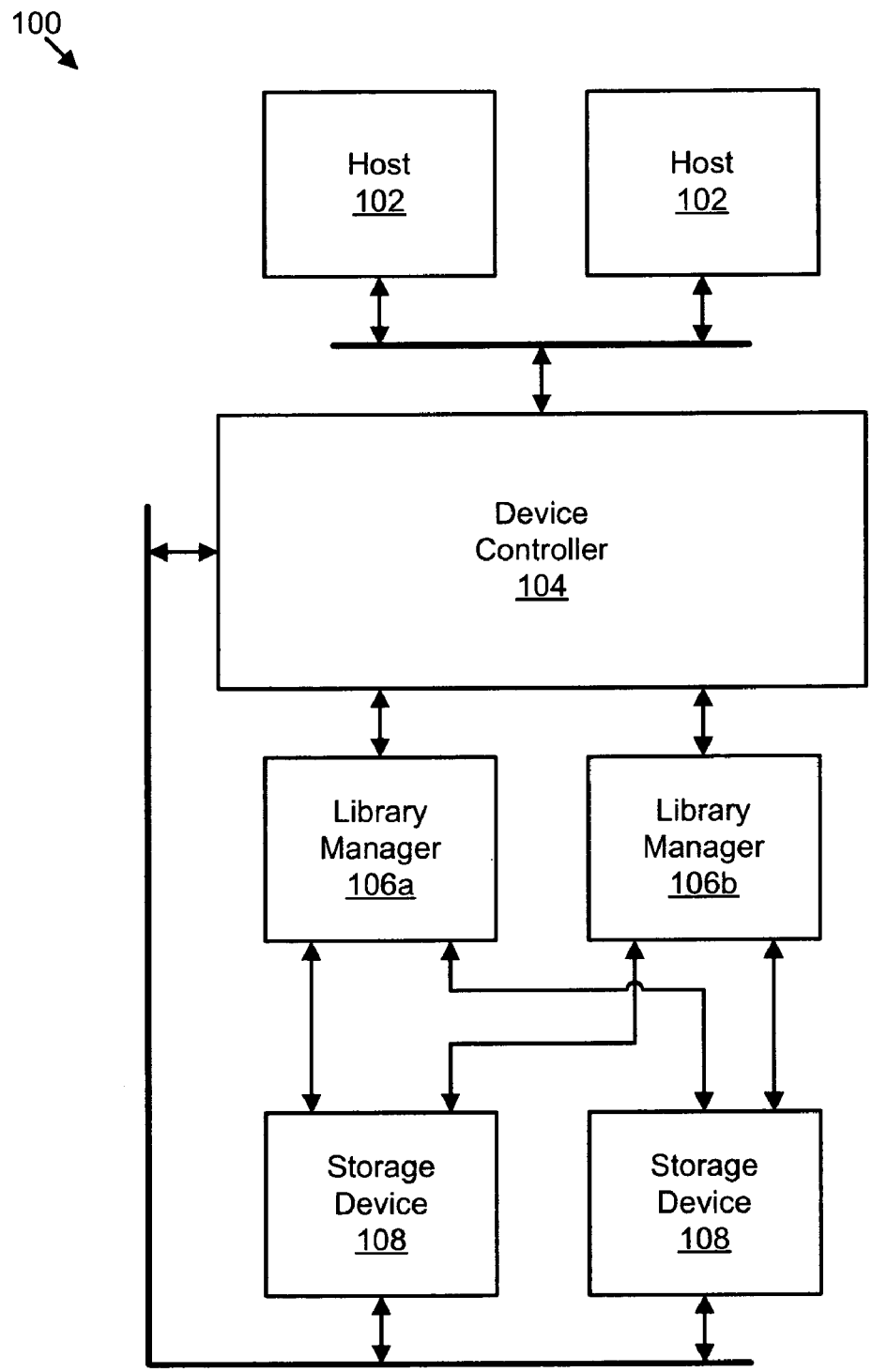
FIG. 1 is a schematic block diagram illustrating one embodiment of a typical library system configured to shutdown a library manager.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Figure 2:
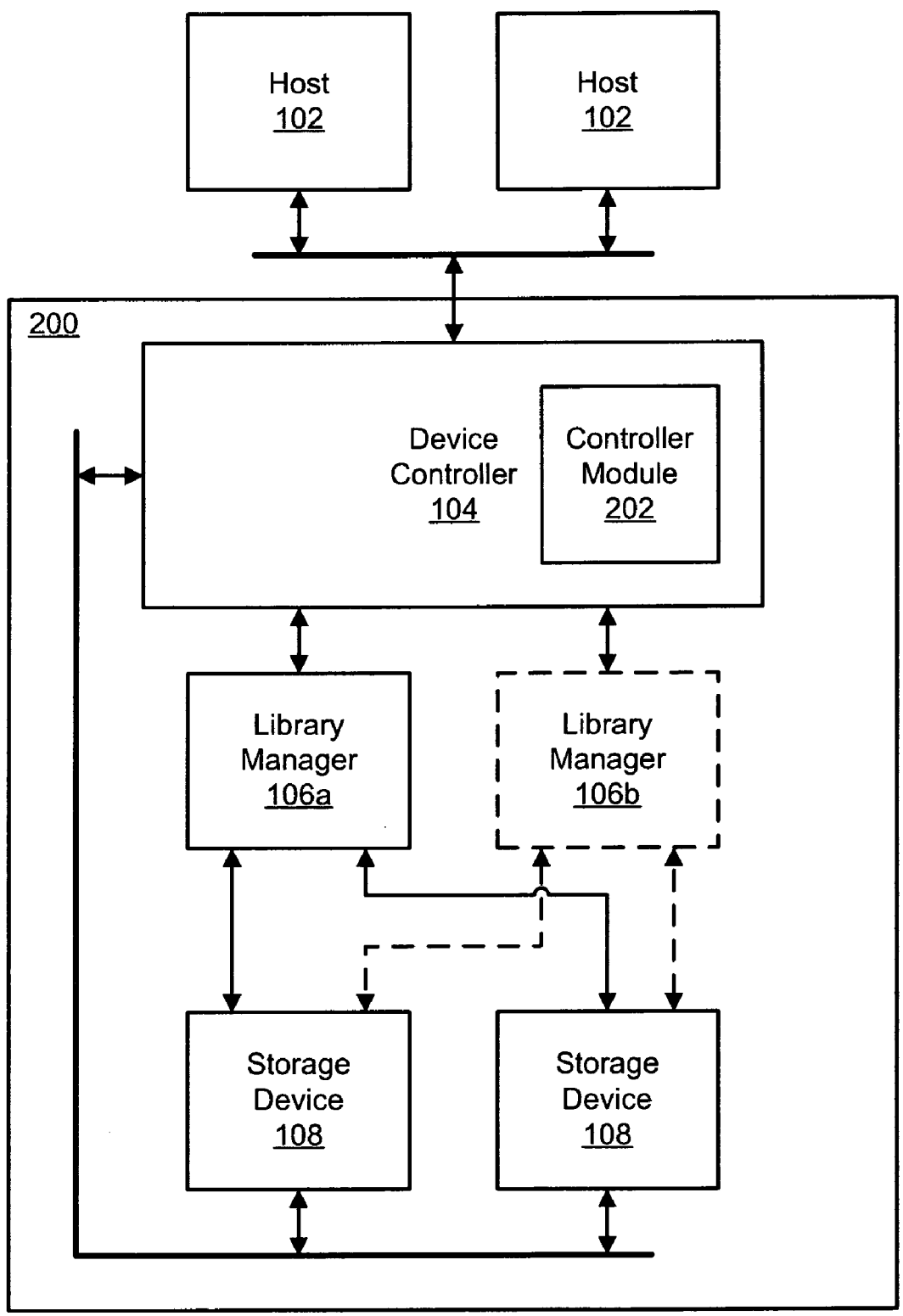
FIG. 2 is a schematic block diagram illustrating one embodiment of a library system to shutdown a library manager while the library is in a partially online state in accordance with the present invention.

FIG. 2 is a schematic block diagram illustrating one embodiment of a library system 200 for shutting down library managers 106 while the library is in a partially online state in accordance with the present invention. As discussed in relation to FIG. 1, the library system 200 includes one or more hosts 102 in communication with a device controller 104 and one or more storage devices 108 coupled to the library manager(s) 106a, 106b. In the illustrated embodiment, the library system 200 includes one library manager 106a. The system 200 may also include more than one device controller 104.

Advantageously, the library system 200 allows the library manager 106a to be shutdown while the storage device 108 remains online with the host 102. Optionally, a second library manager 106b may be included. As used herein, references to a library system 200 typically refer to a single library manager system. However, those skilled in the art will recognize applicability or extension of the concepts to a dual library manager system, a library system with an array of library managers, or any other combination wherein all library managers related to a storage device 108 are to be shutdown at the same time while the library system 200 and storage devices 108 remain in a partially online state. As used herein, a partially online state means that the library system 200 maintains one or more previously mounted storage media in a storage device 108 online and accessible for data transactions to a host 102 while a library manager 106 is shutdown.

Included in the device controller 104 is a controller module 202 configured to shutdown a library manager 106. In an alternate embodiment, the controller module 202 is located in the library manager 106. In another embodiment, the controller module 202 is located in a host 102. In yet another embodiment, the library system 200 may not include a device controller 104. One skilled in the art will recognize other configurations benefited when a library system 200 remains in a partially online state while shutting down one or more library managers 106.

Figure 3:
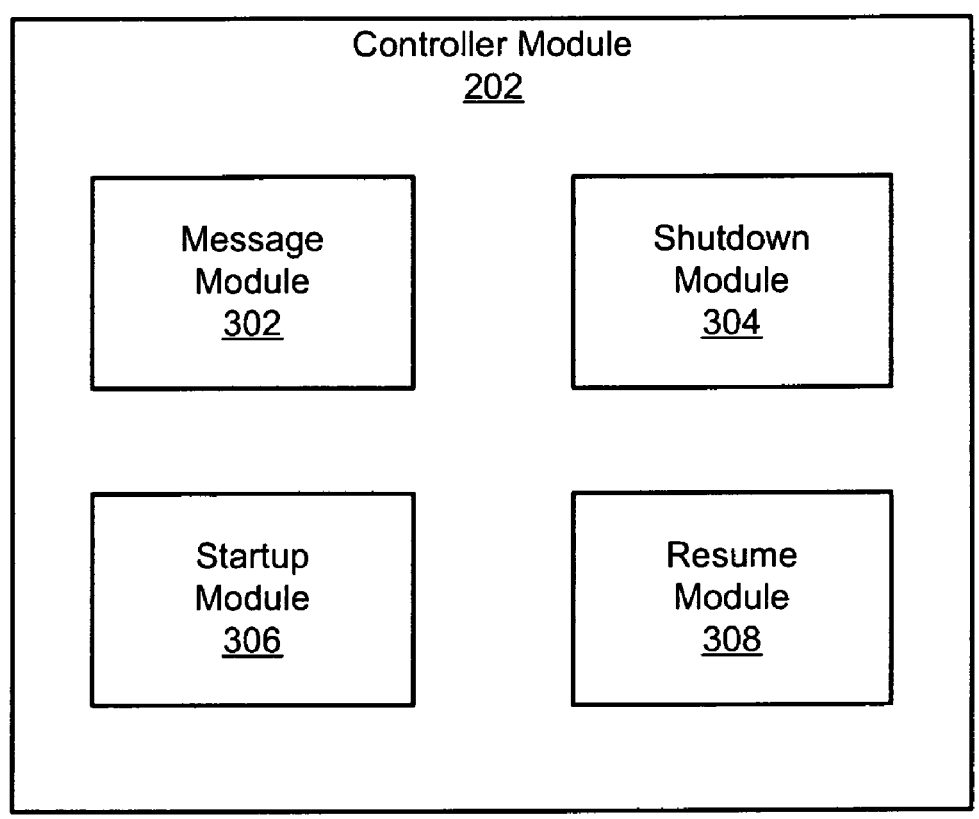
FIG. 3 is a schematic block diagram illustrating one embodiment of an apparatus to shutdown a library manager while the library is in a partially online state in accordance with the present invention.

FIG. 3 is a schematic block diagram illustrating one embodiment of an apparatus 300 for shutting down library managers 106 while the library is in a partially online state in accordance with the present invention. The controller module 202 includes a message module 302. The message module 302 is configured to send a suspend message to a host 102.

In one embodiment, the message module may send a suspend message in the form of a switchover message to a host 102. Using an existing command, such as the switchover command, elicits the desired response from the host 102 even though there is not an actual switching over from a first library manager 106 to a second library manager 106 taking place. Using an existing command advantageously does not require code changes on the hosts 102. The desired response is that the host 102 temporarily stops sending library manager commands so that a single library manager 106 or plurality of library managers 106 can be shutdown for a maintenance operation. In alternative embodiments, a particular suspend message is defined and code changes are made in the apparatus 300 and the hosts 102 to accomplish the desired response from the host 102.

In response to the suspend message, the host 102 stops sending library manager commands. In typical systems, without a suspend message, the host 102 continues to send library manager commands which eventually fail causing the host 102 to waste computer resources and to retry library commands which further wastes computer resources. One skilled in the art will immediately recognize that when the host 102 suspends sending library manager commands, the host 102 will beneficially use less computer resources.

After the message module 302 has sent a suspend message, the library system 200 remains in a partial online state so the host 102 may continue to communicate with previously mounted storage media located on a data storage device 108. With library manager commands inhibited, the library system 200 may be in a partially online state. In this partially online state, the library manager 106 may be shutdown without adversely affecting data connections to the host 102.

Since the host 102 may continue to communicate with one or more previously mounted storage media in the storage device 108, the present embodiment beneficially does not require the library system 200 and associated storage device 108 to be varied offline. Varying a storage device 108 offline may require a long period of time, so allowing the library system 200 to remain partially online, provides a significant time savings over currently available methods for shutting down library managers.

The controller module 202 includes a shutdown module 304 configured to shutdown one or more library managers 106 in library manager system 200. Once shutdown, the library managers 106 are ready for a technician to update the library manager code or perform some other maintenance operation. In another embodiment, a user could update the library manager code or perform a maintenance operation. In yet another embodiment, the library manager code could be updated or a maintenance operation performed automatically as part of the shutdown module 304 or, alternatively, as part of another module or hardware.

The controller module 202 includes a startup module 306 configured to restart one or more library managers 106 after the library manager maintenance or code update is completed. The controller module 202 also includes a resume module 308 configured to notify the host 102 that the library manager(s) 106 is/are available for library manager commands.

Figure 4:
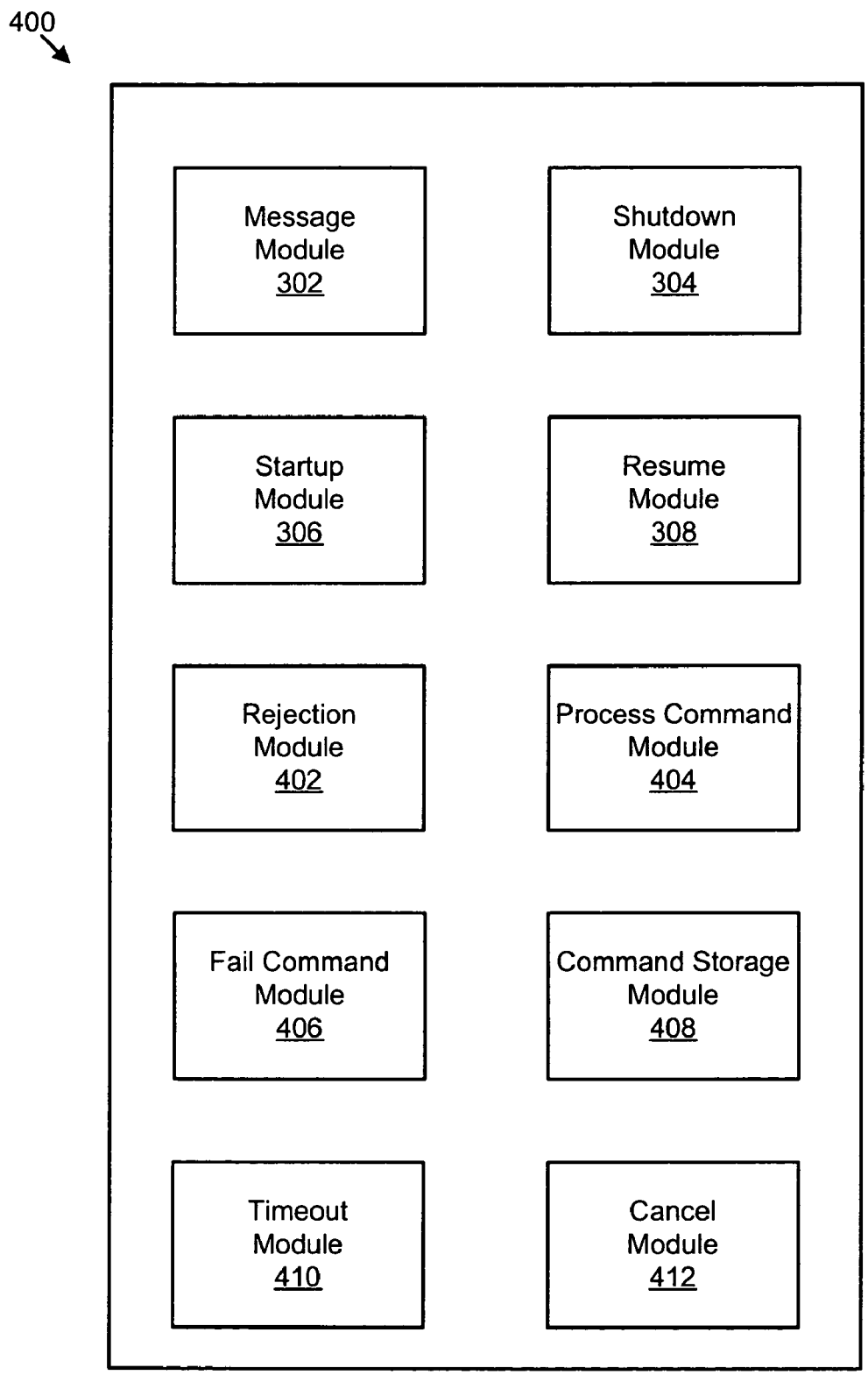
FIG. 4 is a schematic block diagram illustrating another embodiment of an apparatus to shutdown a library manager while the library is in a partially online state in accordance with the present invention.

FIG. 4 is a schematic block diagram illustrating another embodiment of an apparatus 400 for shutting down a library manager 106 while the library system 200 remains in a partially online state. The apparatus 400, in one embodiment, includes substantially the same modules included in the controller module 202 described above. Preferably, the apparatus 400 includes a message module 302, a shutdown module 304, a startup module 306, and a resume module 308.

In addition, the apparatus 400 may include a rejection module 402 configured to reject a library manager command from a host 102. Typically, there is a small window of time from when the message module 302 sends a suspend message to a host 102 until the host 102 suspends transmission of library manager commands. Within this window, certain library manager commands may be transmitted from the host 102. The rejection module 402 rejects any library manager commands during or after this time period. Rejecting library manager commands from a host 102 may take many forms. In one embodiment, the rejection module 402 may transmit a message to the host 102 that the transmitted library manager command has failed. In another embodiment, the rejection module 402 may transmit a message that the library system 200 is online but unavailable for library manager commands. One skilled in the art will recognize other suitable rejection module 402 messages.

The controller module 202 may also include a process command module 404 configured to handle library manager commands that are either queued or are currently being executed by the library manager 106. The controller module 202 may also include a fail command module 406 configured to fail library manager commands that are either queued or are currently being executed by the library manager 106. In addition, the controller module 202 may also include a command storage module 408 configured to store library manager commands that are queued or are currently executing by the library manager 106.

The process command module 404, the fail command module 406, and the command storage module 408 may take many possible combinations of actions. For example, the process command module 404 may allow currently executing library manager commands to continue to completion while the command storage module 408 may store a queued library manager command for later execution. In another example, the fail command module 406 fails currently executing library manager commands as well as unexecuted queued library manager commands. One skilled in the art will recognize other combinations of failing, storing, and processing library manager commands all considered with the scope of the present invention.

Additionally, the apparatus 400 may also include a timeout module 410 configured to initiate a timeout period. In one embodiment, the timeout period may be set by a user. In another embodiment, the timeout period may be set by a technician installing new code or performing maintenance on a library manager 106. One skilled in the art will recognize other ways to set the timeout period.

The timeout period may commence at the beginning of a process for shutting down the library managers 106. Alternatively, the timeout period may commence after the message module 302 sends a suspend message. One skilled in the art will recognize other possible times when the timeout period may begin.

At the end of the timeout period, the timeout module 410 may be configured to signal the process command module 404, the fail command module 406, and the command storage module 408 or any combination thereof as discussed above that the timeout period has expired. The process command module 404, the fail command module 406 and the command storage module 408 may then respond to the expired timeout period. Typically, the fail command module 406 would fail currently executing commands and the command storage module 408 would store queued commands. In addition, the timeout module 410 may be configured to cancel the library manager 106 shutdown.

The apparatus 400 may also include a cancel module 412 configured to cancel shutdown of a library manager 106, send a resume message to the host 102 that the library manager 106 is available for library manager commands, and resume processing library manager commands. Typically, the cancel module 412 requires manual intervention by a user, a technician, or another involved in the shutdown of a library manager 106.

In an alternate embodiment, the cancel module 412 allows manual intervention to end currently executing or queued library manager commands. In another embodiment, the cancel module 412 may allow manual intervention to direct operations associated with the process command module 404, the fail command module 406, and the command storage module 408. Typically, a technician may determine that shutting down a library manager 106 should proceed so the technician directs the fail command module 406 and/or the command storage module 408 to fail or store library manager commands. One skilled in the art will recognize others who may use the cancel module 412 and other configurations of the cancel module 412 allowing manual intervention to end a timeout period, to direct completion, storage, or failure of library manager commands, or to end the library manager 106 shutdown process.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
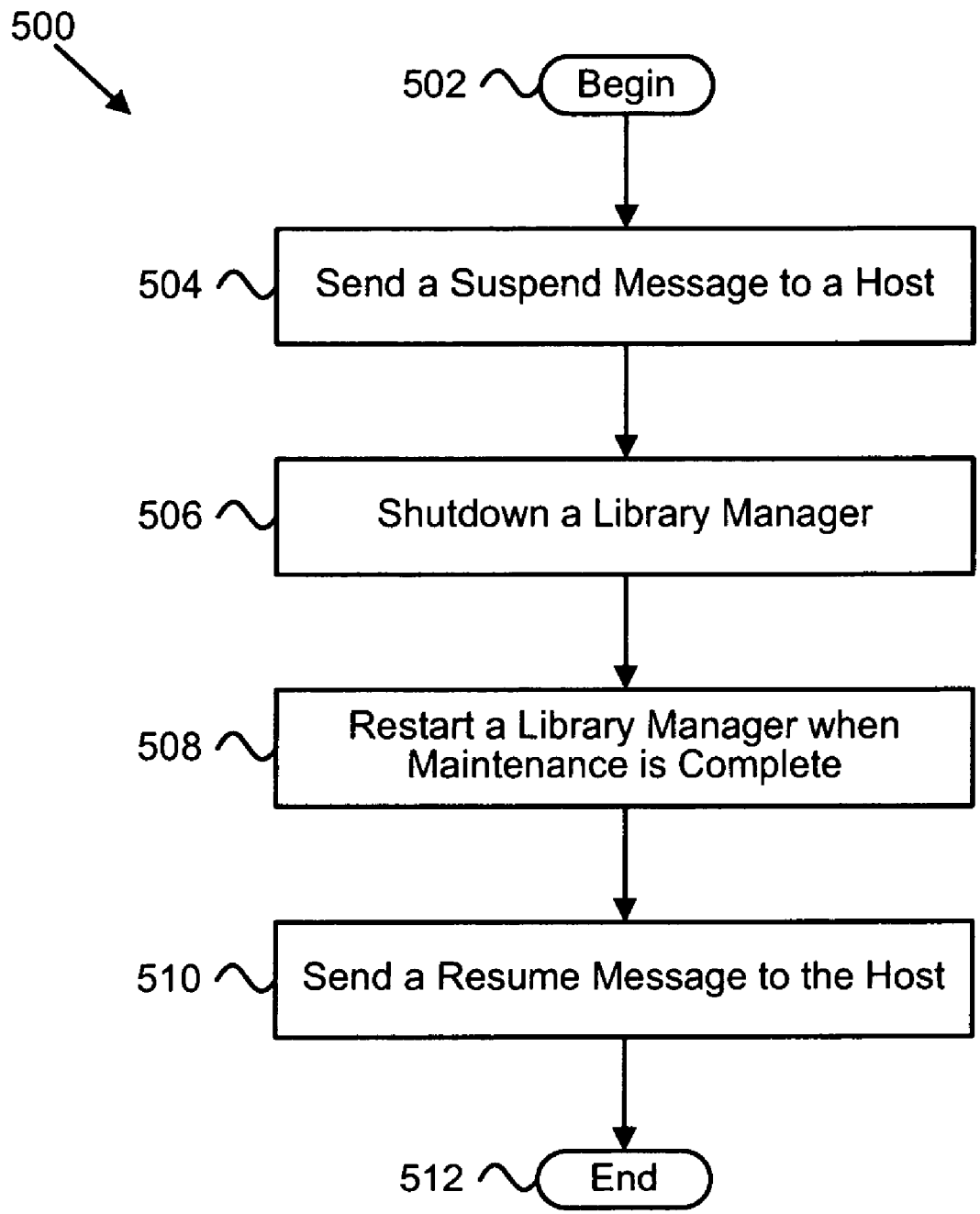
FIG. 5 is a schematic flow chart diagram illustrating one embodiment of a method for shutting down a library manager while the library is in a partially online state in accordance with the present invention.

FIG. 5 is a schematic flow chart diagram illustrating one embodiment of a method 500 for shutting down library managers 106 while the library is in a partially online state in accordance with the present invention. The method 500 begins 502 and the message module 302 sends 504 a suspend message to a host 102. In response, the host 102 suspends transmission of new library manager commands, but remains in a partially online state where data transaction commands may continue with previously mounted storage media in a storage device 108. The shutdown module 304 then shuts 506 down a library manager 106 allowing a technician, user, or another involved in shutting down a library manager to update code or perform a maintenance operation on the library manager 106. When the code update or maintenance operation is completed, the startup module 306 restarts 508 the library manager 106. The resume module 308 then sends 510 a resume message to the host 102 that the library manager 106 is ready to receive a library manager command and the method 500 ends 512.

Figure 6:
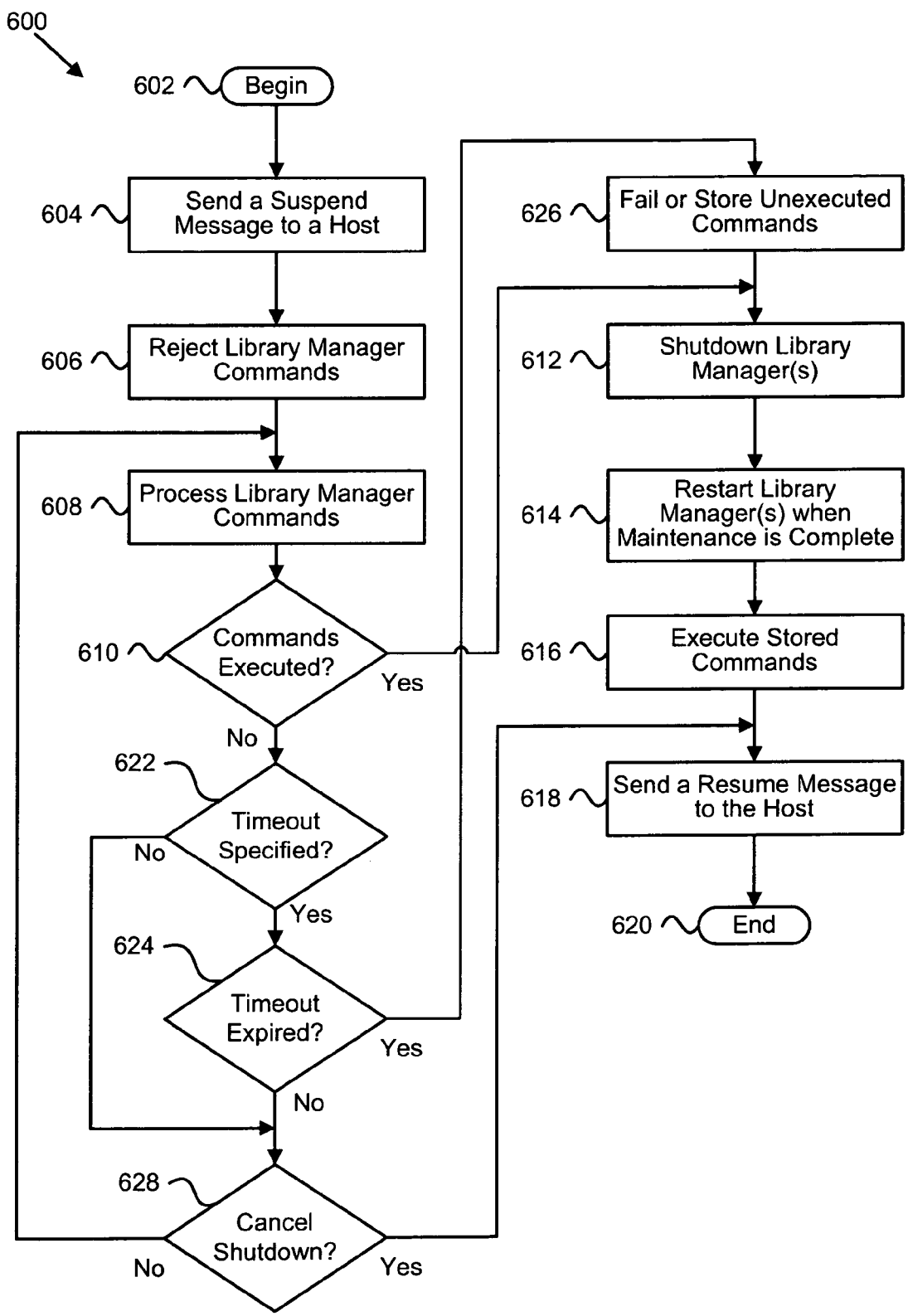
FIG. 6 is a schematic flow chart diagram illustrating another embodiment of a method for shutting down a library manager while the library is in a partially online state in accordance with the present invention.

FIG. 6 is a schematic flow chart diagram illustrating another embodiment of a method 600 for shutting down a library manager 106 while the library system 200 is in a partially online state. The method 600 begins 602 and the message module 302 sends 604 a suspend message to a host 102. In response, the host 102 suspends sending new library manager commands, but remains in a partially online state. The rejection module 402 then rejects 606 any subsequent library manager commands from a host 102. The process command module 404 then processes 608 currently executing and queued library manager commands.

If execution of the library manager commands is completed 610, the shutdown module 304 shuts 612 down a library manager 106 allowing a technician, user, or others to update code or perform a maintenance operation on the library manager 106. When the code update or maintenance operation is completed, the startup module 306 restarts 614 the library manager 106. Optionally, if any library manager commands have been stored, the library manager 106 executes 616 the stored commands. The resume module 308 then sends 618 a resume message to the host 102 that the library manager 106 is ready to receive library manager commands and the method 600 ends 620.

If currently executing or queued library manager commands are not executed 610, the timeout module 412 determines 622 if a timeout period has been specified. If a timeout period has been specified 622, the timeout module 412 then determines 624 if the timeout period has expired. If the timeout period has expired 624, the fail command module 406 and the command storage module 408 fail or store 626 currently executing or queued library manager commands. Possible combinations of failing and storing library manager commands are discussed above in relation to FIG. 4. The shutdown module 304 then shuts 612 down a library manager 106 as discussed above and the method 600 continues as shown in FIG. 6.

If the timeout period has not expired 624, or is not specified 622, the cancel module 412 then determines 628 if there is a manual request to cancel the shutdown of the library manager 106. If there is no user command to cancel 628 the shutdown, the method 600 returns and the process command module 608 continues to execute library manager commands. If there is a command to cancel 628 the shutdown, the resume module 308 then sends 618 a resume message to the host 102 that the library manager 106 is ready to receive library manager commands and the method 600 ends 620. Note that as discussed in relation to FIG. 4, the cancel module 412 may also allow manual intervention by a user, technician or others to end the timeout period before it expires. This manual intervention may fail or store 626 presently currently or queued library manager commands. One skilled in the art will recognize other combinations of the actions discussed above to shutdown a library manager 106 while the library is in a partially online state.

Beneficially, the present invention is distinguished from presently available methods for shutting down library managers 106 because the present invention allows simultaneous shutdown of one or more library managers 106 while maintaining the library system 200 in a partially online state where previously mounted data drives in storage devices 108 are accessible from a host 102. Maintaining previously mounted drives online and accessible to the host 102 takes much less time than forcing the data drives offline. Simultaneous shutdown of the library managers 106 allows major code updates and major maintenance operations not previously possible, using conventional shutdown methods, without varying the library system 202 offline. Additionally, the present invention transmits a suspend message to the host 102. In response the host 102 suspends transmission of library manager commands, which beneficially reduces computer resource usage.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to shutdown a library manager, the apparatus comprising:

a message module configured to send a suspend message to a host such that the host stops sending library manager commands to a library manager in response to the suspend message, the host in communication with a data storage device of a library for servicing data commands through a device controller, the library managed exclusively by the library manager;

a shutdown module configured to shutdown the library manager while the data storage device of the library managed by the library manager remains coupled to the host in a partially online state, the partially online state comprising a state wherein the data storage device remains mounted and accessible for data transactions with the host;

a startup module configured to restart the library manager in response to a completed library manager maintenance operation; and a resume module configured to send a resume message to the host that the library manager is available for library manager commands from the host;

wherein at least one of the message module, the shutdown module, the startup module, and the resume module is at least partially implemented in hardware circuitry and wherein portions of the message module, the shutdown module, the startup module, and the resume module not implemented in hardware circuitry comprise one or more instructions stored on at least one computer readable medium.

2. The apparatus of claim 1, further comprising a rejection module configured to reject a library manager command from the host.

3. The apparatus of claim 1, further comprising a process command module configured to selectively process a library manager command in a queue and a currently executing library manager command.

4. The apparatus of claim 1, further comprising a fail command module configured to selectively fail a library manager command in a queue and a currently executing library manager command.

5. The apparatus of claim 4, wherein the fail command module is further configured to selectively fail a library manager command in the queue and a currently executing library manager command, in response to an expired timeout period or user intervention.

6. The apparatus of claim 1, further comprising a command storage module configured to selectively store a library manager command that is in a queue and a currently executing library manager command.

7. The apparatus of claim 6, wherein the command storage module is further configured to selectively store a library manager command that is in a queue and a currently executing library manager command, in response to an expired timeout period or user intervention.

8. The apparatus of claim 6, wherein the startup module is further configured to execute a stored library manager command.

9. The apparatus of claim 1, comprising a cancel module configured to cancel shutdown of a library manager, resume processing library manager commands, and send a resume message to the host that the library manager is available for library manager commands.

10. The apparatus of claim 1, wherein the shutdown module is further configured to simultaneously shutdown a plurality of library managers and the startup module is further configured to restart a plurality of library managers, wherein the plurality of library managers exclusively manage the library.

11. A system to shutdown a library manager, the system comprising:
one or more hosts;
one or more storage devices of a library;
a device controller, wherein the one or more storage devices are in communication with the host for servicing data commands through a device controller;
a library manager exclusively managing the library; and
a controller module comprising:
a message module configured to send a suspend message to the one or more hosts such that the one or more hosts stops sending library manager commands in response to the suspend message;
a shutdown module configured to shutdown the library manager while a data storage device of the library managed by the library manager remains coupled to the host in a partially online state, the partially online state comprising a state wherein the data storage device remains mounted and accessible for data transactions with the one or more hosts;
a startup module configured to restart the library manager in response to a completed library manager maintenance operation; and
a resume module configured to send a resume message to one or more hosts that the library manager is available for library manager commands from the one or more hosts.

12. The system of claim 11, wherein the controller module further comprises a process command module configured to selectively process a library manager command in a queue and a currently executing library manager command.

13. The system of claim 11, wherein the controller module further comprises a fail command module configured to selectively fail a library manager command in a queue and a currently executing library manager command, in response to an expired timeout period or user intervention.

14. The system of claim 11, wherein the controller module further comprises a command storage module configured to selectively store a library manager command that is in a queue and a currently executing library manager command, in response to an expired timeout period or user intervention, and wherein the startup module is further configured to execute a stored library manager command.

15. The system of claim 11, wherein the shutdown module is further configured to simultaneously shutdown a plurality of library managers and the startup module is further configured to restart a plurality of library managers, wherein the plurality of library managers exclusively manage the library.

16. A computer readable medium tangibly embodying a program of machine-readable instructions executable by a digital processing apparatus to perform operations to shutdown a library manager, the operations comprising:
sending a suspend message to a host such that the host stops sending library manager commands to a library manager in response to the suspend message, the host in communication with a data storage device of a library for servicing data commands through a device controller, the library managed exclusively by the library manager;
shutting down the library manager while the data storage device of the library managed by the library manager remains coupled to the host in a partially online state, the partially online state comprising a state wherein the data storage device remains mounted and accessible for data transactions with the host;
restarting the library manager in response to a completed library manager maintenance operation; and
sending a resume message to the host that the library manager is available for library manager commands from the host.

17. The computer readable medium of claim 16, wherein the instructions further comprise an operation to reject a library manager command from the host.

18. The computer readable medium of claim 16, wherein the instructions further comprise an operation to selectively process a library manager command in a queue and a currently executing library manager command.

19. The computer readable medium of claim 16, wherein the instructions further comprise an operation to selectively fail a library manager command in a queue and a currently executing library manager command, in response to an expired timeout period or user intervention.

20. The computer readable medium of claim 16, wherein:
sending a suspend message further comprises send a suspend message to a plurality of library managers exclusively managing the library;
shutting down the library manager further comprises substantially simultaneously shutting down the plurality of library managers;
restarting the library manager further comprises restarting the plurality of library managers; and
sending a resume message to the host further comprises sending a resume message that the plurality of library managers are available for library manager commands from the host.

* * * * *